US012129792B2

(12) United States Patent
Ueda et al.

(10) Patent No.: US 12,129,792 B2
(45) Date of Patent: Oct. 29, 2024

(54) METHOD FOR CLEANING STEAM SYSTEM OF COMBINED CYCLE PLANT

(71) Applicant: MITSUBISHI HEAVY INDUSTRIES, LTD., Tokyo (JP)

(72) Inventors: Tatsuki Ueda, Tokyo (JP); Kazushige Kuwazuru, Tokyo (JP); Daiki Fujimura, Tokyo (JP); Motohiro Goshima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/275,082

(22) PCT Filed: Mar. 8, 2022

(86) PCT No.: PCT/JP2022/010016
§ 371 (c)(1),
(2) Date: Jul. 31, 2023

(87) PCT Pub. No.: WO2022/191189
PCT Pub. Date: Sep. 15, 2022

(65) Prior Publication Data
US 2024/0133316 A1 Apr. 25, 2024
US 2024/0229677 A9 Jul. 11, 2024

(30) Foreign Application Priority Data

Mar. 12, 2021 (JP) .................. 2021-040565

(51) Int. Cl.
*F02C 6/18* (2006.01)
*F01D 25/00* (2006.01)
*F02C 9/18* (2006.01)

(52) U.S. Cl.
CPC .............. *F02C 6/18* (2013.01); *F01D 25/002* (2013.01); *F02C 9/18* (2013.01)

(58) Field of Classification Search
CPC ............. F02C 6/18; F02C 9/18; F01D 25/002
See application file for complete search history.

(56) References Cited

U.S. PATENT DOCUMENTS

| 2010/0229523 A1* | 9/2010 | Holt | F02C 6/18 60/39.182 |
| 2010/0242430 A1* | 9/2010 | Hu | F02C 6/18 60/39.182 |

(Continued)

FOREIGN PATENT DOCUMENTS

| JP | 7-332014 | 12/1995 |
| JP | 10-331607 | 12/1998 |

OTHER PUBLICATIONS

International Search Report issued May 10, 2022 in International Application No. PCT/JP2022/010016, with English translation.

(Continued)

*Primary Examiner* — Sharidan Carrillo
(74) *Attorney, Agent, or Firm* — Wenderoth, Lind & Ponack, L.L.P.

(57) ABSTRACT

A method for cleaning a steam system including an intermittent operation processing step and a commissioning processing step are executed. The intermittent operation processing step includes: a no-load operation step in which a gas turbine is operated with no load, with a steam stop valve and a bypass valve closed; during the no-load operation step, a pressure accumulating step in which steam is accumulated in a pressure accumulation region; and, after the pressure accumulating step, an intermittent blowing step in which the bypass valve is opened, and steam in the pressure accumulation region is allowed to flow into a condenser. The commissioning processing step includes: a commissioning step in which the gas turbine is commissioned with the steam stop valve closed and the bypass valve (Continued)

open; and a continuous blowing step in which steam from a waste heat recovery boiler is allowed to flow into the condenser.

12 Claims, 2 Drawing Sheets

(56) References Cited

U.S. PATENT DOCUMENTS

2024/0003270 A1\* 1/2024 Smith ................ F02C 3/34
2024/0133316 A1\* 4/2024 Ueda ................ F02C 6/18

OTHER PUBLICATIONS

Written Opinion of the International Searching Authority issued May 10, 2022 in International Application No. PCT/JP2022/010016, with English translation.

\* cited by examiner

METHOD FOR CLEANING STEAM SYSTEM OF COMBINED CYCLE PLANT

TECHNICAL FIELD

The present disclosure relates to a method for cleaning a steam system of a combined cycle plant.

Priority is claimed on Japanese Patent Application No. 2021-040565, filed on Mar. 12, 2021, the content of which is incorporated herein by reference.

BACKGROUND ART

A combined cycle plant includes a gas turbine, a heat recovery steam generator that generates steam by utilizing heat of an exhaust gas from a gas turbine, a steam turbine driven by the steam from the heat recovery steam generator, a condenser that converts the steam exhausted from the steam turbine back to water, various pumps such as a condensate pump and a water supply pump, a main steam line that guides the steam generated by a boiler to the steam turbine, a steam stop valve provided in the main steam line, a water line that guides the water inside the condenser to the boiler via the condensate pump and the water supply pump, a bypass line branched from a position closer to the boiler side than the steam stop valve in the main steam line is and connected to the condenser, and a bypass valve provided in the bypass line.

After the combined cycle plant is constructed, foreign matter such as welding slag and grinding debris remains inside pipes or inside various equipment of the combined cycle plant. Therefore, in the combined cycle plant as described above, blowing-out (or flushing) is performed to remove the foreign matter after the combined cycle plant is constructed or repaired.

For example, a method for cleaning a pipe is disclosed in PTL 1 below.

In the cleaning method disclosed in PTL 1, it is disclosed that a continuous blowing method or an intermittent blowing method is performed. In the continuous blowing method, the steam stop valve is brought into a closed state, and a temporary bypass valve is brought into an opened state. The steam from the heat recovery steam generator is guided to the condenser via the main steam line and the bypass line. In the intermittent blowing method, the steam stop valve and the temporary bypass valve are brought into a closed state, and the steam from the heat recovery steam generator is stored in the main steam line and the bypass line. Thereafter, the temporary bypass valve is opened, and the accumulated steam is guided to the condenser via the bypass line.

In the cleaning method disclosed in PTL 1, the foreign matter remaining inside the pipe is not discharged to the atmosphere together with the steam. Therefore, contamination around the plant and noise generated when the steam is discharged to the atmosphere can be reduced.

CITATION LIST

Patent Literature

[PTL 1] Japanese Unexamined Patent Application Publication No. H10-331607

SUMMARY OF INVENTION

Technical Problem

In the combined cycle plant, it is desirable to shorten a period required until the steam is circulated to the steam turbine after construction work thereof is completed.

Therefore, an object of the present disclosure is to provide a cleaning method which can shorten a period required until the steam is circulated to the steam turbine after construction work of the combined cycle plant is completed.

Solution to Problem

A method for cleaning a combined cycle plant as one aspect for achieving the above-described object is applied to the following combined cycle plant.

The combined cycle plant includes a gas turbine, a heat recovery steam generator configured to generate steam by utilizing heat of an exhaust gas exhausted from the gas turbine, a steam turbine driven by the steam from the heat recovery steam generator, a condenser configured to convert the steam exhausted from the steam turbine back to water, a condensate pump configured to raise a pressure of the water from the condenser, a main steam line configured to guide the steam generated in the heat recovery steam generator to the steam turbine, a steam stop valve provided in the main steam line and configured to stop an inflow of the steam into the steam turbine, a bypass line branched from a position closer to a side of the heat recovery steam generator than the steam stop valve in the main steam line is and connected to the condenser, a bypass valve provided in the bypass line, a condensate line configured to guide the water inside the condenser to the condensate pump, and a water supply line configured to guide the water whose pressure is raised by the condensate pump to the heat recovery steam generator.

In the cleaning method, an intermittent operation processing step, and a commissioning processing step performed after the intermittent processing step are performed.

The intermittent operation processing step includes a no-load operation step of supplying a fuel to the gas turbine, and performing a no-load operation on the gas turbine in a state where the steam stop valve and the bypass valve are closed, a pressure accumulating step of generating the steam in the heat recovery steam generator by utilizing the heat of the exhaust gas from the gas turbine, and accumulating the steam in a pressure accumulating region which is a portion closer to the heat recovery steam generator side than the steam stop valve in the main steam line is and a portion closer to a side of the heat recovery steam generator than the bypass valve in the bypass line is, during the no-load operation step, an intermittent blowing step of stopping fuel supply to the gas turbine, opening the bypass valve, and causing the steam inside the pressure accumulating region to flow into the condenser, after the pressure accumulating step, and a post-intermittent blowing foreign matter removing step of removing foreign matter inside the condenser and inside the condensate line after the intermittent blowing step.

The commissioning processing step includes a commissioning step of supplying the fuel to the gas turbine, and performing commissioning on the gas turbine in a state where the steam stop valve is closed and in a state where the bypass valve is open, a continuous blowing step of generating the steam in the heat recovery steam generator by utilizing the heat of the exhaust gas from the gas turbine, and causing the steam from the heat recovery steam generator to flow into the condenser via a portion of the main steam line and the bypass line, and a post-commissioning foreign matter removing step of removing the foreign matter inside the condenser and inside the condensate line after the fuel supply to the gas turbine is stopped, after the commissioning step.

In the present aspect, the steam system is cleaned without temporarily installing a pipe. Therefore, cleaning costs can be reduced. In addition, in the present aspect, the foreign matter blown off by steam blowing flows into the condenser together with the steam. Therefore, contamination around the plant and noise generated when the steam is discharged to the atmosphere can be reduced.

In the present aspect, the intermittent blowing step is performed to clean the steam system. Thereafter, the continuous blowing step is performed to further clean the steam system. Therefore, the steam system can be efficiently cleaned.

In addition, in the present aspect, the continuous blowing step is performed to clean the steam system during the commissioning by utilizing the steam generated during the commissioning of the gas turbine. Therefore, in the present aspect, compared to a case where the commissioning of the gas turbine and blowing for cleaning the steam system are separately performed, it is possible to shorten a period required until the steam is circulated to the steam turbine after construction work of the combined cycle plant is completed.

Advantageous Effects of Invention

In the cleaning method according to one aspect of the present disclosure, it is possible to shorten a period required until the steam is circulated to the steam turbine after construction work of the combined cycle plant is completed.

DESCRIPTION OF EMBODIMENTS

Hereinafter, embodiments of a method for cleaning a steam system of a combined cycle plant according to the present disclosure will be described.
[Combined Cycle Plant]

Figure 1:
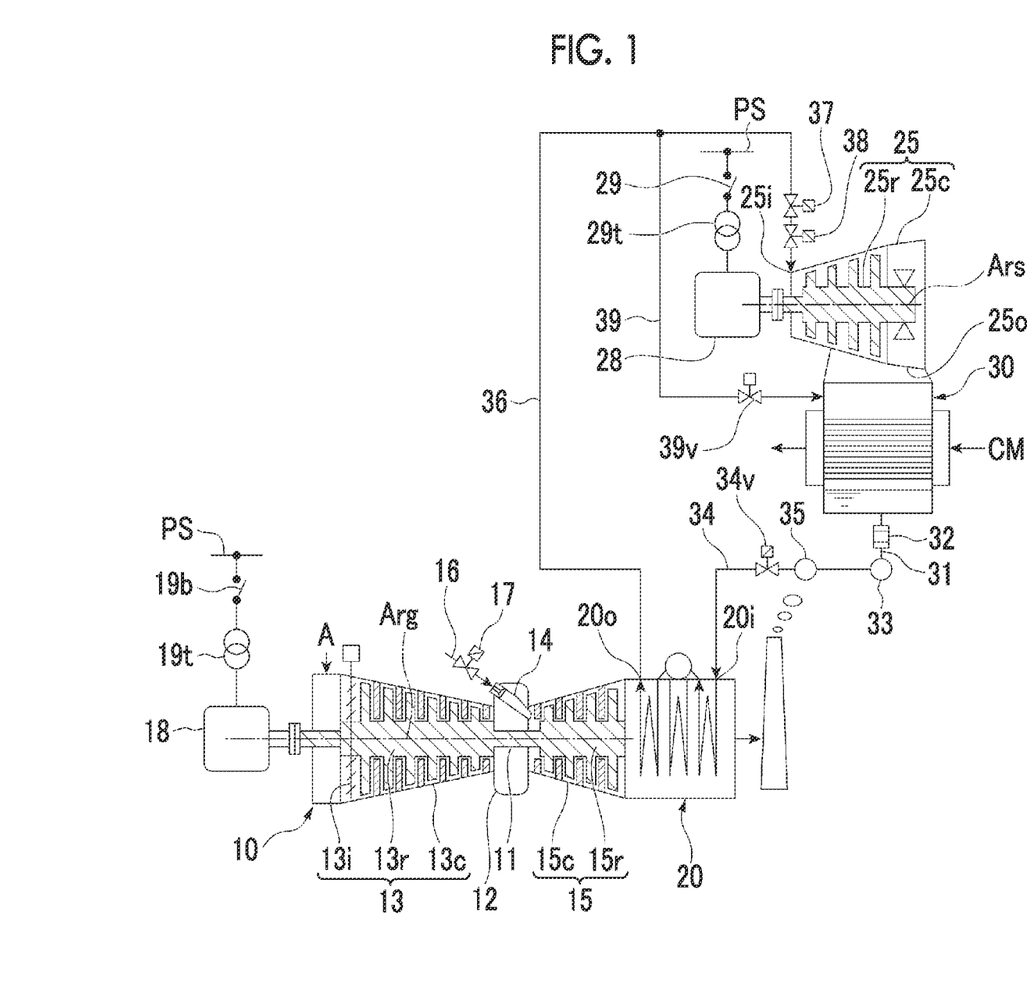
FIG. 1 is a system diagram of a combined cycle plant according to an embodiment of the present disclosure.

A combined cycle plant of the present embodiment will be described with reference to FIG. 1.

The combined cycle plant of the present embodiment includes a gas turbine 10, a gas turbine generator 18, a heat recovery steam generator 20, a steam turbine 25, a steam turbine generator 28, a condenser 30, a condensate line 31, a strainer 32, a condensate pump 33, a water supply line 34, a water supply pump 35, a water supply valve 34v, a main steam line 36, a steam stop valve 37, a steam regulating valve 38, a bypass line 39, and a bypass valve 39v.

The gas turbine 10 has a compressor 13 that compresses air A, a combustor 14 that generates a combustion gas by combusting a fuel F in the air compressed by the compressor 13, and a turbine 15 driven by the combustion gas. The compressor 13 has a compressor rotor 13r that is rotatable around an axis Arg, a compressor casing 13c that covers the compressor rotor 13r, and an air intake amount controller (hereinafter, referred to as an inlet guide vane (IGV)) 13i. The IGV 13i is provided on a suction port side in the compressor casing 13c, and can control a flow rate of the air A suctioned into the compressor casing 13c. The turbine 15 has a turbine rotor 15r that is rotatable around the axis Arg and a turbine casing 15c that covers the turbine rotor 15r.

The gas turbine 10 further has an intermediate casing 12. The intermediate casing 12 is disposed between the compressor casing 13c and the turbine casing 15c in an extending direction of the axis Arg, and connects the compressor casing 13c and the turbine casing 15c.

The combustor 14 is provided in the intermediate casing 12. A fuel line 16 is connected to the combustor 14. The fuel line 16 is provided with a fuel control valve 17 that controls a flow rate of the fuel flowing through the fuel line 16.

The compressor rotor 13r and the turbine rotor 15r are located on the same axis Arg, and are connected to each other to form the gas turbine rotor 11. A rotor of a gas turbine generator 18 is connected to the gas turbine rotor 11. The gas turbine generator 18 can be electrically connected to an external power system PS via a transformer 19t and a breaker 19b.

The heat recovery steam generator 20 has a water inlet 20i and a steam outlet 20o. The heat recovery steam generator 20 converts water flowing from the water inlet 20i into steam by utilizing heat of an exhaust gas exhausted from the gas turbine 10. The steam flows out from the steam outlet 20o.

The steam turbine 25 has a steam turbine rotor 25r that is rotatable around an axis Ars and a steam turbine casing 25c that covers the steam turbine rotor 25r. A steam inlet 25i and an exhaust port 25o are formed in the steam turbine casing 25c. A rotor of a steam turbine generator 28 is connected to the steam turbine rotor 25r. The steam turbine generator 28 can be electrically connected to the external power system PS via a transformer 29t and a breaker 29b.

As described above, in the present embodiment, the rotor of the gas turbine generator 18 is connected to the gas turbine rotor 11, and the rotor of the steam turbine generator 28 is connected to the steam turbine rotor 25r. That is, the combined cycle plant of the present embodiment is a biaxial combined cycle plant. However, the gas turbine rotor 11 and the steam turbine rotor 25r may be connected to each other, and one generator may be connected to the rotor. That is, the combined cycle plant may be a uniaxial combined cycle plant.

The condenser 30 is connected to the exhaust port 25o of the steam turbine casing 25c. The condenser 30 exchanges heat between the steam supplied from the steam turbine 25 and a cooling medium CM, and cools the steam into water.

One end of the condensate line 31 is connected to a bottom of the condenser 30. The other end of the condensate line 31 is connected to a suction port of the condensate pump 33. The condensate pump 33 can raise a pressure of the water from the condenser 30. The condensate line 31 is provided with the strainer 32 capable of removing foreign matter contained in the water flowing through the condensate line 31.

One end of the water supply line 34 is connected to a discharge port of the condensate pump 33. The other end of the water supply line 34 is connected to the water inlet 20i of the heat recovery steam generator 20. The water supply pump 35 and the water supply valve 34v are provided in the water supply line 34. The water supply pump 35 raises the pressure of the water from the condensate line 31, and can supply the water to the heat recovery steam generator 20 via the water supply line 34.

One end of the main steam line 36 is connected to the steam outlet 20o of the heat recovery steam generator 20. The other end of the main steam line 36 is connected to the steam inlet 25i of the steam turbine casing 25c. The steam stop valve 37 and the steam regulating valve 38 are provided in the main steam line 36. One end of the bypass line 39 is connected to a position in the main steam line 36 closer to the heat recovery steam generator 20 than the steam stop valve 37 and the steam regulating valve 38 are. The other end of the bypass line 39 is connected to the condenser 30. The bypass valve 39v is provided in the bypass line 39.

[Method for Cleaning Steam System]

Figure 2:
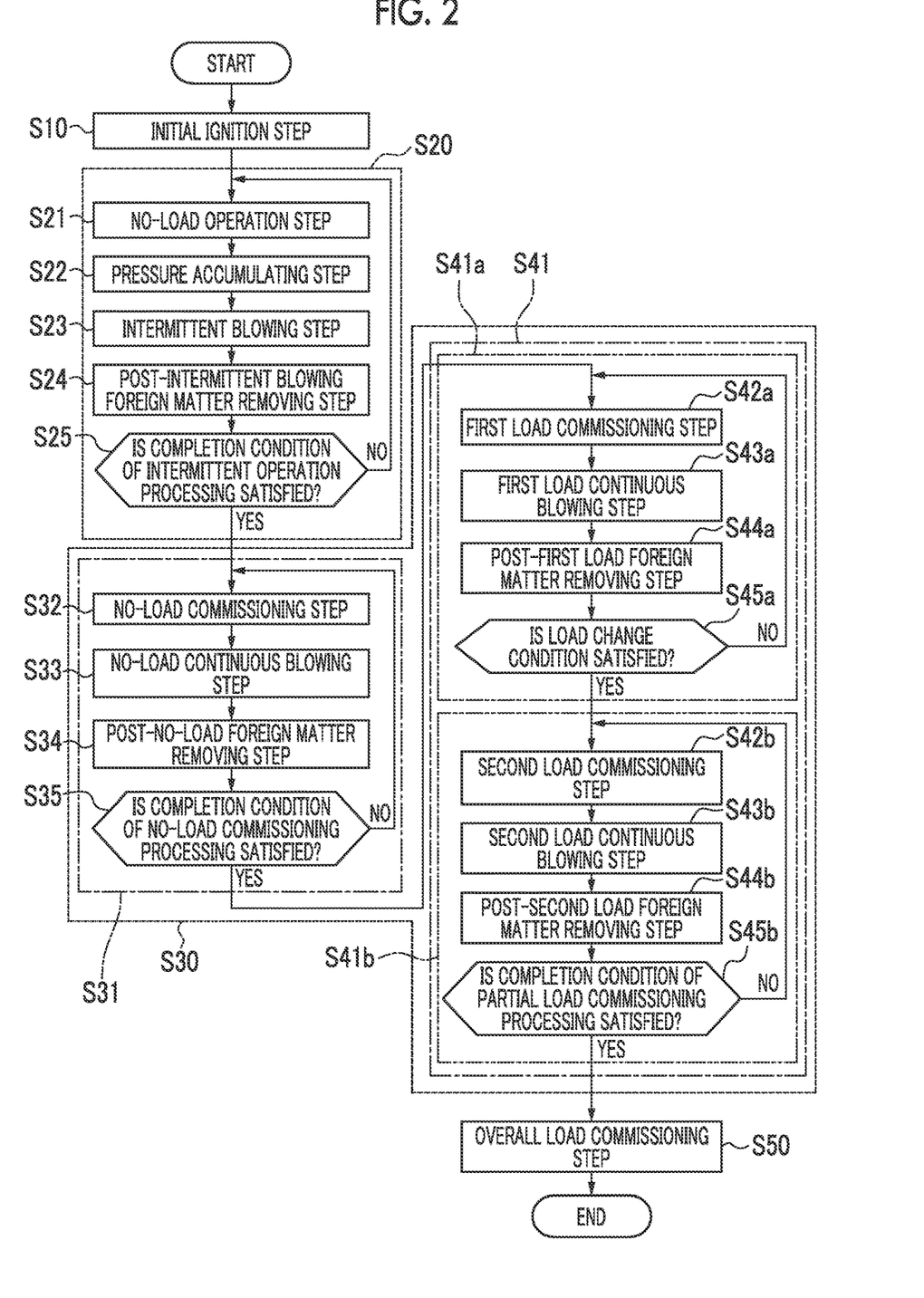
FIG. 2 is a flowchart illustrating an order for performing a plurality of steps until overall commissioning of the combined cycle plant in the embodiment of the present disclosure is performed after construction work of the combined cycle plant is completed.

A method for cleaning a steam system of the combined cycle plant of the present embodiment will be described with reference to a flowchart illustrated in FIG. 2.

The method for cleaning the steam system and the like is applied to a steam system of a combined cycle plant described with reference to FIG. 1. The steam system herein includes the main steam line 36, the bypass line 39, and the condenser 30.

When construction work of the combined cycle plant is completed, an initial ignition step S10 is performed. Thereafter, an intermittent operation processing step S20 of the gas turbine 10, a commissioning processing step S30 of the gas turbine 10, and an overall commissioning step 350 are sequentially performed. The cleaning method of the present embodiment is performed in the intermittent operation processing step S20 of the gas turbine 10 and the commissioning processing step S30 of the gas turbine 10.

In the initial ignition step S10, the fuel is supplied to the combustor 14, and the combustion gas is generated inside the combustor 14 to drive the turbine 15. In the initial ignition step S10, it is confirmed whether or not the fuel is combusted inside the combustor 14 and the turbine 15 is driven.

After the initial ignition step S10, the intermittent operation processing step S20 of the gas turbine 10 is performed. In the intermittent operation processing step S20, a no-load operation step S21, a pressure accumulating step S22, an intermittent blowing step S23, a post-intermittent blowing foreign matter removing step S24, and a determination step S25 are performed.

In the no-load operation step S21, the fuel is supplied to the gas turbine 10 and a no-load operation is performed on the gas turbine 10 in a closed state of the steam stop valve 37 and the bypass valve 39v. In the no-load operation step S21, the condensate pump 33 and the water supply pump 35 are driven in an open state of the water supply valve 34v. The no-load operation is an operation of the gas turbine 10 in a state where the gas turbine generator 18 is not electrically connected to an external system, that is, in a state where the breakers 19b and 29b are open.

The pressure accumulating step S22 is performed during the no-load operation step S21. In the pressure accumulating step S22, the steam is generated in the heat recovery steam generator 20 by utilizing the heat of the exhaust gas from the gas turbine 10, and the steam is stored in a pressure accumulating region which is a portion closer to a side of the heat recovery steam generator 20 than the steam stop valve 37 in the main steam line 36 is and a portion closer to a side of the heat recovery steam generator 20 than the bypass valve 39v in the bypass line 39 is.

When the pressure inside the pressure accumulating region is equal to or higher than a predetermined pressure in performing the pressure accumulating step S22, fuel supply to the gas turbine 10 is stopped, and the no-load operation step S21 and the pressure accumulating step S22 are completed. At this time, the water supply valve 34v is closed, and the condensate pump 33 and the water supply pump 35 are stopped. The intermittent blowing step S23 is performed after the no-load operation step S21 and the pressure accumulating step S22. In the intermittent blowing step S23, the bypass valve 39v is opened, and the steam inside the pressure accumulating region is caused to flow into the condenser 30 at once. In performing the intermittent blowing step S23, a portion of the foreign matter between the bypass valve 39v and the condenser 30 in the pressure accumulating region and the bypass line 39 flows into the condenser 30 together with the steam.

The post-intermittent blowing foreign matter removing step S24 is performed after the intermittent blowing step S23. In the post-intermittent blowing foreign matter removing step S24, the foreign matter inside the condenser and inside the condensate line 31 is removed. Specifically, for example, a worker enters the condenser 30, and removes the foreign matter inside the condenser 30. Furthermore, the worker removes the foreign matter accumulated in the strainer 32 provided in the condensate line 31.

The determination step S25 is performed after the post-intermittent blowing foreign matter removing step S24. In the determination step S25, the worker determines whether or not a completion condition of the intermittent operation processing has been satisfied. Here, for example, the completion condition of the intermittent operation processing means that the number of times of performing the intermittent operation processing step S20 reaches a predetermined number of times, or that the amount of the foreign matter removed in the post-intermittent blowing foreign matter removing step S24 is equal to or smaller than a predetermined amount.

When the worker determines that the completion condition of the intermittent operation processing has not been satisfied, the no-load operation step S21, the pressure accumulating step S22, the intermittent blowing step S23, the post-intermittent blowing foreign matter removing step S24, and the determination step S25 which are described above are performed again. That is, in the present embodiment, the intermittent operation processing step S20 may be performed multiple times. In this way, when the intermittent operation processing step S20 is performed multiple times, the intermittent blowing step S23 is performed during each intermittent operation processing step S20. Therefore, efficiency in removing the foreign matter inside the steam system can be improved.

In addition, when the worker determines that the completion condition of the intermittent operation processing has been satisfied, the commissioning processing step S30 of the gas turbine 10 is performed.

The commissioning processing step S30 of the gas turbine 10 includes a no-load commissioning processing step S31 and a partial load commissioning processing step S41 performed after the no-load commissioning processing step S31.

The no-load commissioning processing step S31 includes a no-load commissioning step S32, a no-load continuous blowing step S33, a post-no-load foreign matter removing step S34, and a determination step S35.

In the no-load commissioning step S32, the fuel is supplied to the gas turbine 10, and no-load commissioning is performed on the gas turbine 10 in a state where the steam stop valve 37 is closed and in a state where the bypass valve 39v is open. In the no-load commissioning step S32, the condensate pump 33 and the water supply pump 35 are driven in an open state of the water supply valve 34v. Here, the commissioning is an operation including a step of adjusting the control system of the gas turbine 10. Specifically, for example, adjusting the control system is adjusting control parameters of the IGV 13i or the fuel control valve 17, based on data obtained by the operation of the gas turbine 10. In the no-load operation step S21 in the above-described intermittent operation processing step S20, the control system of the gas turbine 10 is not adjusted. Accordingly, the operation of the gas turbine 10 in the no-load operation step S21 is not the commissioning.

The no-load continuous blowing step S33 is performed during the no-load commissioning step S32. In the no-load continuous blowing step S33, during the no-load commissioning step S32, the steam is generated in the heat recovery steam generator 20 by utilizing the heat of the exhaust gas from the gas turbine 10, and the steam from the heat recovery steam generator 20 is caused to flow into the condenser 30 via a portion of the main steam line 36 and the bypass line 39. In performing the no-load continuous blowing step S33, a portion of the foreign matter in a portion of the main steam line 36 and the bypass line 39 flows into the condenser 30 together with the steam.

After the no-load commissioning step S32, the fuel supply to the gas turbine 10 is stopped, the water supply valve 34v is closed, the condensate pump 33 and the water supply pump 35 are stopped, and thereafter, the post-no-load foreign matter removing step S34 is performed. In the post-no-load foreign matter removing step S34, the foreign matter inside the condenser 30 and inside the condensate line 31 is removed in the same manner as in the above-described post-intermittent blowing foreign matter removing step S24.

The determination step S35 is performed after the post-no-load foreign matter removing step S34. In the determination step S35, the worker determines whether or not the completion condition of the no-load commissioning processing has been satisfied. Here, for example, the completion condition of the no-load commissioning processing means that the adjustment of the control system in the no-load commissioning step S32 is completed, or that the adjustment of the control system in the no-load commissioning step S32 is completed and the amount of the foreign matter removed in the post-no-load foreign matter removing step S34 is equal to or smaller than a predetermined amount.

When the worker determines that the completion condition of the no-load commissioning processing has not been satisfied, the no-load commissioning step S32, the no-load continuous blowing step S33, the post-no-load foreign matter removing step S34, and the determination step S35 which are described above are performed again. That is, in the present embodiment, in some cases, the no-load commissioning processing step S31 may be performed multiple times. In this way, when the no-load commissioning processing step S31 is performed multiple times, the no-load continuous blowing step S33 is performed during each no-load commissioning processing step S31. Therefore, efficiency in removing the foreign matter in the steam system can be improved.

In addition, when the worker determines that the completion condition of the no-load commissioning processing has been satisfied, the partial load commissioning processing step S41 of the gas turbine 10 is performed.

The partial load commissioning processing step S41 includes a first load commissioning processing step S41a and a second load commissioning processing step S41b performed after the first load commissioning processing step S41a.

The first load commissioning processing step S41a includes a first load commissioning step S42a, a first load continuous blowing step S43a, a post-first load foreign matter removing step S44a, and a determination step S45a.

In the first load commissioning step S42a, the fuel is supplied to the gas turbine 10, and the commissioning is performed on the gas turbine 10 with a first load, in a state where the steam stop valve 37 is closed and in a state where the bypass valve 39v is open. In the first load commissioning step S42a, the condensate pump 33 and the water supply pump 35 are driven in an open state of the water supply valve 34v. Here, for example, the first load is a load of 20% to 40% when the rated load of the gas turbine 10 is 100%.

The first load continuous blowing step S43a is performed during the first load commissioning step S42a. In the first load continuous blowing step S43a, the steam is generated in the heat recovery steam generator 20 by utilizing the heat of the exhaust gas from the gas turbine 10 during the first load commissioning step S42a, and the steam from the heat recovery steam generator 20 is caused to flow into the condenser 30 via a portion of the main steam line 36 and the bypass line 39. In performing the first load continuous blowing step S43a, a portion of the foreign matter in a portion of the main steam line 36 and the bypass line 39 flows into the condenser 30 together with the steam.

After the first load commissioning step S42a, the fuel supply to the gas turbine 10 is stopped, the water supply valve 34v is closed, the condensate pump 33 and the water supply pump 35 are stopped, and thereafter, the post-first load foreign matter removing step S44a is performed. In the post-first load foreign matter removing step S44a, the foreign matter inside the condenser 30 and inside the condensate line 31 is removed in the same manner as in the above-described post-intermittent blowing foreign matter removing step S24.

The determination step S45a is performed after the post-first load foreign matter removing step S44a. In the determination step S45a, the worker determines whether or not a load change condition has been satisfied. Here, for example, the load change condition means that the adjustment of the control system in the first load commissioning step S42a is completed, or that the adjustment of the control system in the first load commissioning step S42a is completed and the amount of the foreign matter removed in the post-first load foreign matter removing step S44a is equal to or smaller than a predetermined amount.

When the worker determines that the load change condition has not been satisfied, the first load commissioning step S42a, the first load continuous blowing step S43a, the post-first load foreign matter removing step S44a, and the determination step S45a which are described above are performed again. That is, in the present embodiment, in some cases, the first load commissioning processing step S41a may be performed multiple times. In this way, when the first load commissioning processing step S41a is performed multiple times, the first load continuous blowing step S43a is performed during each first load commissioning processing step S41a. Therefore, efficiency in removing the foreign matter inside the steam system can be improved.

In addition, when the worker determines that the load change has been satisfied, the second load commissioning processing step S41b of the gas turbine 10 is performed.

The second load commissioning processing step S41b includes a second load commissioning step S42b, a second load continuous blowing step S43b, a post-second load foreign matter removing step S44b, and a determination step S45b.

In the second load commissioning step S42b, the fuel is supplied to the gas turbine 10 and the commissioning is performed on the gas turbine 10 with a second load larger than the first load, in a state where the steam stop valve 37 is closed and in a state where the bypass valve 39v is open. In the second load commissioning step S42b, the condensate pump 33 and the water supply pump 35 are driven in an open state of the water supply valve 34v. Here, for example, the second load is a load of 45, to 70% when the rated load of the gas turbine 10 is 100%.

The second load continuous blowing step S43b is performed during the second load commissioning step S42b. In the second load continuous blowing step S43b, the steam is generated in the heat recovery steam generator 20 by utilizing the heat of the exhaust gas from the gas turbine 10 during the second load commissioning step S42b, and the steam from the heat recovery steam generator 20 is caused to flow into the condenser 30 via a portion of the main steam line 36 and the bypass line 39. In performing the second load continuous blowing step S43b, a portion of the foreign matter in a portion of the main steam line 36 and the bypass line 39 flows into the condenser 30 together with the steam.

After the second load commissioning step S42b, the fuel supply to the gas turbine 10 is stopped, the water supply valve 34v is closed, the condensate pump 33 and the water supply pump 35 are stopped, and thereafter, the post-second load foreign matter removing step S44b is performed. In the post-second load foreign matter removing step S44b, the foreign matter inside the condenser 30 and inside the condensate line 31 is removed in the same manner as in the above-described post-intermittent blowing foreign matter removing step S24.

The determination step S45b is performed after the post-second load foreign matter removing step S44b. In the determination step S45b, the worker determines whether or not the completion condition of the second load commissioning processing has been satisfied. Here, for example, the completion condition of the second load commissioning processing means that the adjustment of the control system in the second load commissioning step S42b is completed, or that the adjustment of the control system in the second load commissioning step S42b is completed and the amount of the foreign matter removed in the post-second load foreign matter removing step S44b is equal to or smaller than a predetermined amount.

When the worker determines that the completion condition of the second load commissioning processing has not been satisfied, the second load commissioning step S42b, the second load continuous blowing step S43b, the post-second load foreign matter removing step S44b, and the determination step S45b which are described above are performed again. That is, in the present embodiment, in some cases, the second load commissioning processing step S41b may be performed multiple times. In this way, when the second load commissioning processing step S41b is performed multiple times, the second load continuous blowing step S43b is performed during each second load commissioning processing step S41b. Therefore, efficiency in removing the foreign matter in the steam system can be improved.

In addition, when the worker determines that the completion condition of the second load commissioning processing has been satisfied, the second load commissioning processing step S41b of the gas turbine 10 is completed. Therefore, in this case, the commissioning processing step S30 of the gas turbine 10 is completed. The cleaning method in the present embodiment is completed by completing the commissioning processing step S30.

When the commissioning processing step S30 of the gas turbine 10 is completed, the overall commissioning step S50 is performed. In the overall commissioning step S50, the fuel is supplied to the gas turbine 10, and the commissioning is performed on the gas turbine 10 with a rated load, for example, in a state where the steam stop valve 37 is closed and in a state where the bypass valve 39v is open. In the overall commissioning step S50, the condensate pump 33 and the water supply pump 35 are driven in an open state of the water supply valve 34v. In an initial stage of the commissioning, the steam from the heat recovery steam generator 20 flows into the condenser 30 via the main steam line 36 and the bypass line 39. Then, when the steam from the heat recovery steam generator 20 satisfies a turbine supply condition during the initial stage, whereas the bypass valve 39v is closed, the steam stop valve 37 and the steam regulating valve 38 are opened. As a result, the steam from the heat recovery steam generator 20 starts to flow into the steam turbine 25. Then, an opening degree of the steam regulating valve 38 is gradually increased, and the commissioning is performed on the steam turbine 25 with the rated load, for example.

In each of the steps described above, each of the no-load commissioning step S32, the first load commissioning step S42a, and the second load commissioning step S42b is a portion of the commissioning steps S32, S42a, and S42b in the commissioning processing step S30. In addition, each of the first load commissioning step S42a and the second load commissioning step S42b is a portion of the partial load commissioning steps S42a and S42b in the partial load commissioning processing step S41. Each of the no-load continuous blowing step S33, the first load continuous blowing step S43a, and the second load continuous blowing step S43b is a portion of the continuous blowing steps S33, S43a, and S43b in the commissioning processing step S30. Each of the first load continuous blowing step S43a and the second load continuous blowing step S43b is a portion of the partial load continuous blowing steps S43a and S43b. Each of the post-no-load foreign matter removing step S34, the post-first load foreign matter removing step S44a, and the post-second load foreign matter removing step S44b is a portion of the post-commissioning foreign matter removing steps S34, S44a, and S44b in the commissioning processing step S30. Each of the post-first load foreign matter removing step S44a and the post-second load foreign matter removing step S44b is a portion of the post-partial load foreign matter removing steps S44a and S44b.

As described above, in the present embodiment, the steam system is cleaned without temporarily installing a pipe. Therefore, cleaning costs can be reduced. In addition, in the present embodiment, the foreign matter blown off by steam blowing flows into the condenser 30 together with the steam. Therefore, contamination around the plant and noise generated when the steam is discharged to the atmosphere can be reduced.

In addition, in the present embodiment, the intermittent blowing step S23 is performed to clean the steam system. Thereafter, the continuous blowing steps S33, S43a, and S43b are performed to further clean the steam system. Therefore, the steam system can be efficiently cleaned.

Furthermore, in the present embodiment, the steam system is cleaned by utilizing the steam generated during the commissioning of the gas turbine 10 and performing the continuous blowing steps S33, S43a, and S43b during the commissioning. Therefore, in the present embodiment, compared to a case where the commissioning of the gas turbine 10 and steam blowing for cleaning the steam system are separately performed, it is possible to shorten a period required until the steam is circulated to the steam turbine 25 after the construction work of the combined cycle plant is completed.

Here, a force for blowing off the foreign matter inside a pipe by using the steam will be referred to as a cleaning force F. As illustrated in Equation (1) below, the cleaning force F is a value obtained by multiplying a dynamic pressure P inside the pipe by a flow rate Q of the steam flowing inside the pipe.

$$F = P \times Q \tag{1}$$

The dynamic pressure P inside the pipe can be expressed by Equation (2) below.

$$P = (\gamma/2g) \times V \tag{2}$$

In addition, $\gamma$ is a specific weight of the steam, g is gravitational acceleration, and V is a flow velocity.

In addition, the flow rate Q of the steam can be expressed by Equation (3) below.

$$Q = A \cdot V \tag{3}$$

A is a cross-sectional area of the pipe.

When the dynamic pressure P inside the pipe expressed by Equation (2) and the flow rate Q of the steam expressed by Equation (3) are substituted into Equation (1), the cleaning force F can be expressed by Equation (4) below.

$$\begin{aligned} F &= P \times Q \\ &= ((\gamma/2g) \times V) \times A \cdot V \\ &= (\gamma/2g) \times A \cdot V^2 \end{aligned} \tag{4}$$

The cleaning force inside the main steam line 36 during the rated operation of the steam turbine 25 will be defined as a rated cleaning force Fn, and the cleaning force inside the main steam line 36 and the bypass line 39 during blowing in the intermittent blowing step S23 and the continuous blowing steps S33, S43a, and S43b which are described above will be defined as a rated cleaning force Fb. In addition, the cleaning force Fb during the blowing with respect to the rated cleaning force Fn will be defined as a cleaning force ratio R (=Fb/Fn).

In the present embodiment, in the intermittent blowing step S23, the no-load continuous blowing step S33, and the first load continuous blowing step S43a, the operation of the bypass valve 39v is controlled so that the cleaning force ratio R is lower than 1. In addition, in the present embodiment, in the second load continuous blowing step S43b, the operation of the bypass valve 39v is controlled so that the cleaning force ratio R is 1 or higher.

In the present embodiment, as described above, the cleaning force ratio R in the intermittent blowing step S23, the no-load continuous blowing step S33, and the first load continuous blowing step S43a is set to be lower than 1. In this manner, during these steps, the foreign matter which is relatively likely to be blown off inside the pipe is blown off, and the foreign matter which is relatively less likely to be blown off inside the pipe is easily blown off. Then, the cleaning force ratio R in the second load continuous blowing step S43b after these steps is set to 1 or higher. In this manner, the foreign matter which cannot be blown off in the previous step is blown off in the second load continuous blowing step S43b. Therefore, in the present embodiment, the steam system can also be efficiently cleaned from this viewpoint.

In some cases, the cleaning force ratio R in the intermittent blowing step S23, the no-load continuous blowing step S33, and the first load continuous blowing step S43a may be 1 or higher.

Hitherto, the embodiments of the present disclosure have been described in detail. However, the present disclosure is not limited to the above-described embodiments. Various additions, changes, replacements, or partial deletions can be made within the scope that does not deviate from the conceptual idea and the gist of the present disclosure derived from the contents defined in the scope of the appended claims and the equivalent thereof.

[Additional Notes]

The method for cleaning the steam system of the combined cycle plant in the above-described embodiments can be understood as follows, for example.

(1) The method for cleaning a steam system of a combined cycle plant in a first aspect is applied to the following combined cycle plant.

The combined cycle plant includes the gas turbine 10, the heat recovery steam generator 20 capable of generating the steam by utilizing the heat of the exhaust gas exhausted from the gas turbine 10, the steam turbine 25 that can be driven by the steam from the heat recovery steam generator 20, the condenser 30 capable of converting the steam exhausted from the steam turbine 25 back to water, the condensate pump 33 capable of raising the pressure of the water from the condenser 30, the main steam line 36 capable of guiding the steam generated in the heat recovery steam generator 20 to the steam turbine 25, the steam stop valve 37 provided in the main steam line 36 and capable of stopping the inflow of the steam into the steam turbine 25, the bypass line 39 branched from a position closer to a side of the heat recovery steam generator 20 than the steam stop valve 37 in the main steam line 36 is and connected to the condenser 30, the bypass valve 39v provided in the bypass line 39, the condensate line 31 capable of guiding the water inside the condenser 30 to the condensate pump 33, and the water supply line 34 capable of guiding the water whose pressure is raised by the condensate pump 33 to the heat recovery steam generator 20.

In the cleaning method, the intermittent operation processing step S20 and the commissioning processing step S30 performed after the intermittent processing step are performed.

The intermittent operation processing step S20 includes the no-load operation step S21 of supplying the fuel to the gas turbine 10, and performing the no-load operation on the gas turbine 10 in a state where the steam stop valve 37 and the bypass valve 39v are closed, the pressure accumulating step S22 of generating the steam in the heat recovery steam generator 20 by utilizing the heat of the exhaust gas from the gas turbine 10 during the no-load operation step S21, and accumulating the steam in a pressure accumulating region which is a portion closer to the heat recovery steam generator 20 side than the steam stop valve 37 in the main steam line 36 is and a portion closer to the heat recovery steam generator 20 side than the bypass valve 39v in the bypass line 39 is, the intermittent blowing step S23 of stopping the fuel supply to the gas turbine 10, opening the bypass valve 39v after the pressure accumulating step S22, and causing the steam inside the pressure accumulating region to flow into the condenser 30, and the post-intermittent blowing foreign matter removing step S24 of removing the foreign matter inside the condenser 30 and inside the condensate line 31 after the intermittent blowing step S23.

The commissioning processing step S30 includes the commissioning steps S32, S42a, and S42b of supplying the fuel to the gas turbine 10, and performing the commissioning on the gas turbine 10, in a state where the steam stop valve 37 is closed and in a state where the bypass valve 39v is open, the continuous blowing steps S33, S43a, and S43b of generating the steam in the heat recovery steam generator 20 by utilizing the heat of the exhaust gas from the gas turbine 10, and causing the steam from the heat recovery steam generator 20 to flow into the condenser 30 via a portion of the main steam line 36 and the bypass line 39, in the commissioning step S32, S42a, and S42b, and the post-commissioning foreign matter removing steps S34, S44a, and S44b of removing the foreign matter inside the condenser 30 and inside the condensate line 31 after the fuel supply to the gas turbine 10 is stopped, after the commissioning steps S32, S42a, and S42b.

In the present aspect, the steam system is cleaned without temporarily installing a pipe. Therefore, cleaning costs can be reduced. In addition, in the present aspect, the foreign matter blown off by the steam blowing flows into the condenser 30 together with the steam. Therefore, contamination around the plant and noise generated when the steam is discharged to the atmosphere can be reduced.

In the present aspect, the intermittent blowing step S23 is performed to clean the steam system, and thereafter, the continuous blowing steps S33, S43a, and S43b are performed to further clean the steam system. Therefore, the steam system can be efficiently cleaned.

In addition, in the present aspect, the steam system is cleaned by utilizing the steam generated during the commissioning of the gas turbine 10 and performing the continuous blowing steps S33, S43a, and S43b during the commissioning. Therefore, in the present aspect, compared to a case where the commissioning of the gas turbine 10 and steam blowing for cleaning the steam system are separately performed, it is possible to shorten a period required until the steam is circulated to the steam turbine 25 after the construction work of the combined cycle plant is completed.

(2) There is provided a method for cleaning a steam system of a combined cycle plant according to a second aspect.

In the method for cleaning the steam system of the combined cycle plant in the first aspect, the intermittent operation processing step S20 is performed multiple times before the commissioning steps S32, S42a, and S42b.

In the present aspect, the intermittent operation processing step S20 is performed multiple times, and the intermittent blowing step S23 is performed during each intermittent operation processing step S20. Therefore, efficiency in removing the foreign matter inside the steam system can be improved.

(3) There is provided a method for cleaning a steam system of a combined cycle plant according to a third aspect.

In the method for cleaning the steam system of the combined cycle plant according to the first aspect or the second aspect, the commissioning processing step S30 includes the partial load commissioning processing step S41. The partial load commissioning processing step S41 includes the partial load commissioning steps S42a and S42b which are portions of the commissioning steps S32, S42a and S42b, the partial load continuous blowing steps S43a and S43b which are portions of the continuous blowing steps S33, S43a and S43b, and the post-partial load foreign matter removing steps S44a and S44b which are portions of the post-commissioning foreign matter removing steps S34, S44a, and S44b. In the partial load commissioning steps S42a and S42b, the fuel is supplied to the gas turbine 10, and the partial load commissioning is performed on the gas turbine 10, in a state where the steam stop valve 37 is closed and in a state where the bypass valve 39v is open. In the partial load continuous blowing steps S43a and S43b, the steam is generated in the heat recovery steam generator 20 by utilizing the heat of the exhaust gas from the gas turbine 10 during the partial load commissioning steps S42a and S42b, and the steam from the heat recovery steam generator 20 is caused to flow into the condenser 30 via a portion of the main steam line 36 and the bypass line 39. After the partial load commissioning steps S42a and S42b, the fuel supply to the gas turbine 10 is stopped, and thereafter, the post-partial load foreign matter removing steps S44a and S44b are performed. In the post-partial load foreign matter removing steps S44a and S44b, the foreign matter inside the condenser 30 and inside the condensate line 31 is removed.

In the present aspect, the partial load continuous blowing steps S43a and S43b are performed during the partial load commissioning processing step S41. Therefore, efficiency in removing the foreign matter inside the steam system can be improved, compared to a case of the no-load continuous blowing.

(4) There is provided a method for cleaning a steam system of a combined cycle plant according to a fourth aspect.

In the method for cleaning the steam system of the combined cycle plant according to the third aspect, the partial load commissioning processing step 41 (S41a and S41b) is performed multiple times.

In the present aspect, the partial load commissioning processing step S41 (S41a and 41b) is performed multiple times, and the partial load continuous blowing steps S43a and S43b are performed during each of the partial load commissioning processing steps S41a and S41b. Therefore, efficiency in removing the foreign matter inside the steam system can be improved.

(5) There is provided a method for cleaning a steam system of a combined cycle plant according to a fifth aspect.

In the method for cleaning the steam system of the combined cycle plant according to the fourth aspect, when a ratio of the force Fb for blowing off the foreign matter by using the steam inside the main steam line 36 and the bypass line 39 during the blowing in the intermittent blowing step S23 and the continuous blowing steps S33, S43a, and S43b with respect to the force Fn for blowing off the foreign matter by using the steam inside the main steam line 36 during the rated operation of the steam turbine 25 is defined as the cleaning force ratio R, in the partial load commissioning processing step S41 performed multiple times, at least in the partial load continuous blowing step S43b during the finally performed partial load commissioning processing step 41, an operation of the bypass valve 39v is controlled so that the cleaning force ratio R is 1 or higher.

In the present aspect, at least in the blowing step performed before the partial load continuous blowing step S43b in the finally performed partial load commissioning processing step S41b, the foreign matter which is relatively likely to be blown off inside the steam system is blown off, and the foreign matter which is relatively less likely to be blown off inside the steam system is easily blown off. Then, the cleaning force ratio in the partial load continuous blowing step S43b after the blowing step is set to 1 or higher, and the foreign matter which cannot be blown off in the previous blowing step is blown off in the partial load continuous blowing step S43b. Therefore, in the present aspect, the steam system can be efficiently cleaned.

(6) There is provided a method for cleaning a steam system of a combined cycle plant according to a sixth aspect.

In the method for cleaning the steam system of the combined cycle plant according to the fifth aspect, in the intermittent blowing step S23, the operation of the bypass valve 39v is controlled so that the cleaning force ratio R is lower than 1.

(7) There is provided a method for cleaning a steam system of a combined cycle plant according to a seventh aspect.

In the method for cleaning the steam system of the combined cycle plant according to the first aspect or the second aspect, the commissioning processing step S30 includes the partial load commissioning processing step S41. The partial load commissioning processing step S41 includes the first load commissioning processing step S41a and the second load commissioning processing step S41b performed after the first load commissioning processing. The first load commissioning processing step S41a includes the first load commissioning step S42a which is a portion of the commissioning steps S32, S42a, and S42b, the first load continuous blowing step S43a which is a portion of the continuous blowing steps S33, S43a, and S43b, and the post-first load foreign matter removing step S44a which is a portion of the post-commissioning foreign matter removing steps S34, S44a, and S44b. In the first load commissioning step S42a, the fuel is supplied to the gas turbine 10, and the commissioning is performed on the gas turbine 10 with the first load smaller than the rated load, in a state where the steam stop valve 37 is closed and in a state where the bypass valve 39v is open. In the first load continuous blowing step S43a, the steam is generated in the heat recovery steam generator 20 by utilizing the heat of the exhaust gas from the gas turbine 10 during the first load commissioning step S42a, and the steam from the heat recovery steam generator 20 is caused to flow into the condenser 30 via a portion of the main steam line 36 and the bypass line 39. After the first load commissioning step S42a, the fuel supply to the gas turbine 10 is stopped, and thereafter, the post-first load foreign matter removing step S44a is performed. In the post-first load foreign matter removing step S44a, the foreign matter inside the condenser 30 and inside the condensate line 31 is removed. The second load commissioning processing step S41b includes the second load commissioning step S42b which is a portion of the commissioning steps S32, S42a, and S42b, the second load continuous blowing step S43b which is a portion of the continuous blowing steps S33, S43a, and S43b, and the post-second load foreign matter removing step S44b which is a portion of the post-commissioning foreign matter removing steps S34, S44a, and S44b. In the second load commissioning step S42b, the fuel is supplied to the gas turbine 10, and the commissioning is performed on the gas turbine 10 with the second load larger than the first load and smaller than the rated load, in a state where the steam stop valve 37 is closed and in a state where the bypass valve 39v is open. In the second load continuous blowing step S43b, the steam is generated in the heat recovery steam generator 20 by utilizing the heat of the exhaust gas from the gas turbine 10 during the second load commissioning step S42b, and the steam from the heat recovery steam generator 20 is caused to flow into the condenser 30 via a portion of the main steam line 36 and the bypass line 39. After the second load commissioning step S42b, the fuel supply to the gas turbine 10 is stopped, and thereafter, the post-second load foreign matter removing step S44b is performed. In the post-second load foreign matter removing step S44b, the foreign matter inside the condenser 30 and inside the condensate line 31 is removed.

In the present aspect, the partial load commissioning processing steps S42a and S42b are performed multiple times, and the partial load continuous blowing steps S43a and S43b are performed during the each of the partial load commissioning steps S42a and S42b. Therefore, efficiency in removing the foreign matter inside the steam system can be improved.

(8) There is provided a method for cleaning a steam system of a combined cycle plant according to an eighth aspect.

In the method for cleaning the steam system of the combined cycle plant according to the seventh aspect, when a ratio of the force Fb for blowing off the foreign matter by using the steam inside the main steam line 36 and the bypass line 39 during the blowing in the intermittent blowing step S23 and the continuous blowing steps S33, S43a, and S43b with respect to the force Fn for blowing off the foreign matter by using the steam inside the main steam line 36 during the rated operation of the steam turbine 25 is defined as the cleaning force ratio R, in the second load continuous blowing step S43b, the operation of the bypass valve 39v is controlled so that the cleaning force ratio R is 1 or higher.

In the present aspect, in the blowing step performed before the second load continuous blowing step S43b in the second load commissioning processing step S41b, the foreign matter which is relatively likely to be blown off inside the steam system is blown off, and the foreign matter which is relatively less likely to be blown off inside the steam system is easily blown off. Then, the cleaning force ratio R in the second load continuous blowing step S43b after the blowing step is set to 1 or higher. In this manner, the foreign matter which cannot be blown off in the previous blowing step is blown off in the partial load continuous blowing step S43b. Therefore, in the present aspect, the steam system can be efficiently cleaned.

(9) There is provided a method for cleaning a steam system of a combined cycle plant according to a ninth aspect.

In the method for cleaning the steam system of the combined cycle plant according to the eighth aspect, in the intermittent blowing step S23 and the first load continuous blowing step S43a, the operation of the bypass valve 39v is controlled so that the cleaning force ratio R is lower than 1.

(10) There is provided a method for cleaning a steam system of a combined cycle plant according to a tenth aspect.

In the method for cleaning the steam system of the combined cycle plant according to any one of the third aspect to the ninth aspect, the commissioning processing step S30 includes the no-load commissioning processing step S31 performed before the partial load commissioning processing step S41. The no-load commissioning processing step S31 includes the no-load commissioning step S32 which is a portion of the commissioning steps S32, S42a, and S42b, the no-load continuous blowing step S33 which is a portion of the continuous blowing steps S33, S43a, and S43b, and the post-no-load foreign matter removing step S34 which is a portion of the post-commissioning foreign matter removing steps S34, S44a, and S44b. In the no-load commissioning step S32, the fuel is supplied to the gas turbine 10, and the no-load commissioning is performed on the gas turbine 10, in a state where the steam stop valve 37 is closed and in a state where the bypass valve 39v is open. In the no-load continuous blowing step S33, the steam is generated in the heat recovery steam generator 20 by utilizing the heat of the exhaust gas from the gas turbine 10 during the no-load commissioning step S32, and the steam from the heat recovery steam generator 20 is caused to flow into the condenser 30 via a portion of the main steam line 36 and the bypass line 39. After the no-load commissioning step S32, the fuel supply to the gas turbine 10 is stopped, and thereafter, the post-no-load foreign matter removing step S34 is performed. In the post-no-load foreign matter removing step S34, the foreign matter inside the condenser 30 and inside the condensate line 31 is removed.

In the present aspect, the continuous blowing step S33 is also performed in the no-load commissioning processing step S31 performed before the partial load commissioning processing step S41. Therefore, efficiency in removing the foreign matter inside the steam system can be improved.

(11) There is provided a method for cleaning a steam system of a combined cycle plant according to an eleventh aspect.

In the method for cleaning the steam system of the combined cycle plant according to the tenth aspect, the no-load commissioning processing step S31 is performed multiple times.

In the present aspect, the no-load commissioning processing step S31 is performed multiple times, and the no-load continuous blowing step S33 is performed during each no-load commissioning step S31. Therefore, efficiency in removing the foreign matter inside the steam system can be improved.

(12) There is provided a method for cleaning a steam system of a combined cycle plant according to a twelfth aspect.

In the method for cleaning the steam system of the combined cycle plant according to the tenth aspect or the eleventh aspect, when a ratio of the force Fb for blowing off the foreign matter by using the steam inside the main steam line 36 and the bypass line 39 during the blowing in the continuous blowing steps S33, S43a, and S43b with respect to the force Fn for blowing off the foreign matter by using the steam inside the main steam line 36 during the rated operation of the steam turbine 25 is defined as the cleaning force ratio R, in the no-load continuous blowing step S33, the operation of the bypass valve 39v is controlled so that the cleaning force ratio R is lower than 1.

INDUSTRIAL APPLICABILITY

In the cleaning method according to one aspect of the present disclosure, it is possible to shorten a period required until the steam is circulated to the steam turbine after construction work of the combined cycle plant is completed.

REFERENCE SIGNS LIST

10: Gas turbine
11: Gas turbine rotor
12: Intermediate casing
13: Compressor
13r: Compressor rotor
13c: Compressor casing
13i: Air intake amount controller (IGV)
14: Combustor
15: Turbine
15r: Turbine rotor
15c: Turbine casing
16: Fuel line
17: Fuel control valve
18: Gas turbine generator
19t: Transformer
19b: Breaker
20: Heat recovery steam generator
20i: Water inlet
20o: Steam outlet
25: Steam turbine
25r: Steam turbine rotor
25c: Steam turbine casing
25i: Steam inlet
25o: Exhaust port
28: Steam turbine generator
29t: Transformer
29b: Breaker
30: Condenser
31: Condensate line
32: Strainer
33: Condensate pump
34: Water supply line
34v: Water supply valve
35: Water supply pump
36: Main steam line
37: Steam stop valve
38: Steam regulating valve
39: Bypass line
39v: Bypass valve
Arg, Ars: Axis
PS: External power system

The invention claimed is:

1. A method for cleaning a steam system of a combined cycle plant including a gas turbine, a heat recovery steam generator configured to generate steam by utilizing heat of an exhaust gas exhausted from the gas turbine, a steam turbine driven by the steam from the heat recovery steam generator, a condenser configured to convert the steam exhausted from the steam turbine back to water, a condensate pump configured to raise a pressure of the water from the condenser, a main steam line configured to guide the steam generated in the heat recovery steam generator to the steam turbine, a steam stop valve provided in the main steam line and configured to stop an inflow of the steam into the steam turbine, a bypass line branched from a position closer to a side of the heat recovery steam generator than the steam stop valve in the main steam line is and connected to the condenser, a bypass valve provided in the bypass line, a condensate line configured to guide the water inside the condenser to the condensate pump, and a water supply line configured to guide the water whose pressure is raised by the condensate pump to the heat recovery steam generator, the method comprising:
an intermittent operation processing step; and
a commissioning processing step performed after the intermittent processing step,
wherein the intermittent operation processing step includes
a no-load operation step of supplying a fuel to the gas turbine, and performing a no-load operation on the gas turbine in a state where the steam stop valve and the bypass valve are closed,
a pressure accumulating step of generating the steam in the heat recovery steam generator by utilizing the heat of the exhaust gas from the gas turbine, and accumulating the steam in a pressure accumulating region which is a portion closer to a side of the heat recovery steam generator than the steam stop valve in the main steam line is and a portion closer to the heat recovery steam generator side than the bypass valve in the bypass line is, during the no-load operation step,
an intermittent blowing step of stopping fuel supply to the gas turbine, opening the bypass valve, and causing the steam inside the pressure accumulating region to flow into the condenser, after the pressure accumulating step, and
a post-intermittent blowing foreign matter removing step of removing foreign matter inside the condenser and inside the condensate line after the intermittent blowing step, and
the commissioning processing step includes
a commissioning step of supplying the fuel to the gas turbine, and performing commissioning on the gas turbine, in a state where the steam stop valve is closed and in a state where the bypass valve is open,
a continuous blowing step of generating the steam in the heat recovery steam generator by utilizing the heat of the exhaust gas from the gas turbine, and causing the steam from the heat recovery steam generator to flow into the condenser via a portion of the main steam line and the bypass line, during the commissioning step, and
a post-commissioning foreign matter removing step of removing the foreign matter inside the condenser and inside the condensate line after a fuel supply to the gas turbine is stopped, after the commissioning step.

2. The method for cleaning a steam system of a combined cycle plant according to claim 1,
wherein the intermittent operation processing step is performed multiple times before the commissioning step.

3. The method for cleaning a steam system of a combined cycle plant according to claim 1,
wherein the commissioning processing step includes a partial load commissioning processing step,
the partial load commissioning processing step includes
a partial load continuous blowing step which is a portion of the continuous blowing step, and
a post-partial load foreign matter removing step which is a portion of the post-commissioning foreign matter removing step,
in the partial load commissioning step, the fuel is supplied to the gas turbine, and partial load commissioning is performed on the gas turbine, in a state where the steam stop valve is closed and in a state where the bypass valve is open,
in the partial load continuous blowing step, the steam is generated in the heat recovery steam generator by utilizing the heat of the exhaust gas from the gas turbine, and the steam from the heat recovery steam generator is caused to flow into the condenser via a portion of the main steam line and the bypass line, during the partial load commissioning step, and
the post-partial load foreign matter removing step is performed after the fuel supply to the gas turbine is stopped, after the partial load commissioning step, and
in the post-partial load foreign matter removing step, the foreign matter inside the condenser and inside the condensate line is removed.

4. The method for cleaning a steam system of a combined cycle plant according to claim 1,
wherein the commissioning processing step includes a partial load commissioning processing step,
the partial load commissioning processing step includes a first load commissioning processing step and a second load commissioning processing step performed after the first load commissioning processing,
the first load commissioning processing step includes
a first load continuous blowing step which is a portion of the continuous blowing step, and
a post-first load foreign matter removing step which is a portion of the post-commissioning foreign matter removing step,
in the first load commissioning step, the fuel is supplied to the gas turbine, and commissioning is performed on the gas turbine in a state where the steam stop valve is closed and in a state where the bypass valve is open,
in the first load continuous blowing step, the steam is generated in the heat recovery steam generator by utilizing the heat of the exhaust gas from the gas turbine, and the steam from the heat recovery steam generator is caused to flow into the condenser via a portion of the main steam line and the bypass line, during the first load commissioning step, and
the post-first load foreign matter removing step is performed after the fuel supply to the gas turbine is stopped, after the first load commissioning step,
in the post-first load foreign matter removing step, the foreign matter inside the condenser and inside the condensate line is removed,
the second load commissioning processing step includes
a second load continuous blowing step which is a portion of the continuous blowing step, and
a post-second load foreign matter removing step which is a portion of the post-commissioning foreign matter removing step,
in the second load commissioning step, the fuel is supplied to the gas turbine, and commissioning is performed on the gas turbine in a state where the steam stop valve is closed and in a state where the bypass valve is open,
in the second load continuous blowing step, the steam is generated in the heat recovery steam generator by utilizing the heat of the exhaust gas from the gas turbine, the steam from the heat recovery steam generator is caused to flow into the condenser via a portion of the main steam line and the bypass line, during the second load commissioning step, and
the post-second load foreign matter removing step is performed after the fuel supply to the gas turbine is stopped, after the second load commissioning step, and
in the post-second load foreign matter removing step, the foreign matter inside the condenser and inside the condensate line is removed.

5. The method for cleaning a steam system of a combined cycle plant according to claim 3,
wherein the partial load commissioning processing step is performed multiple times.

6. The method for cleaning a steam system of a combined cycle plant according to claim 3,
wherein the commissioning processing step includes a no-load commissioning processing step performed before the partial load commissioning processing step,
the no-load commissioning processing step includes
a no-load continuous blowing step which is a portion of the continuous blowing step, and
a post-no-load foreign matter removing step which is a portion of the post-commissioning foreign matter removing step,
in the no-load commissioning step, the fuel is supplied to the gas turbine, and no-load commissioning is performed on the gas turbine, in a state where the steam stop valve is closed and in a state where the bypass valve is open,
in the no-load continuous blowing step, the steam is generated in the heat recovery steam generator by utilizing the heat of the exhaust gas from the gas turbine, and the steam from the heat recovery steam generator is caused to flow into the condenser via a portion of the main steam line and the bypass line, during the no-load commissioning step, and the post-no-load foreign matter removing step is performed after the fuel supply to the gas turbine is stopped, after the no-load commissioning step, and in the post-no-load foreign matter removing step, the foreign matter inside the condenser and inside the condensate line is removed.

7. The method for cleaning a steam system of a combined cycle plant according to claim 4, wherein when a ratio of a force for blowing off foreign matter by using the steam inside the main steam line and the bypass line during blowing in the intermittent blowing step and the continuous blowing step to a force for blowing off foreign matter by using the steam inside the main steam line during a rated operation of the steam turbine is defined as a cleaning force ratio, in the second load continuous blowing step, an operation of the bypass valve is controlled so that the cleaning force ratio is 1 or higher.

8. The method for cleaning a steam system of a combined cycle plant according to claim 5, wherein when a ratio of a force for blowing off foreign matter by using the steam inside the main steam line and the bypass line during blowing in the intermittent blowing step and the continuous blowing step to a force for blowing off foreign matter by using the steam inside the main steam line during a rated operation of the steam turbine is defined as a cleaning force ratio, in the partial load commissioning processing step performed multiple times, at least in the partial load continuous blowing step during the finally performed partial load commissioning processing step, an operation of the bypass valve is controlled so that the cleaning force ratio is 1 or higher.

9. The method for cleaning a steam system of a combined cycle plant according to claim 6, wherein the no-load commissioning processing step is performed multiple times.

10. The method for cleaning a steam system of a combined cycle plant according to claim 6, wherein when a ratio of a force for blowing off foreign matter by using the steam inside the main steam line and the bypass line during blowing in the continuous blowing step to a force for blowing off foreign matter by using the steam inside the main steam line during a rated operation of the steam turbine is defined as a cleaning force ratio, in the no-load continuous blowing step, an operation of the bypass valve is controlled so that the cleaning force ratio is lower than 1.

11. The method for cleaning a steam system of a combined cycle plant according to claim 7, wherein in the intermittent blowing step and the first load continuous blowing step, the operation of the bypass valve is controlled so that the cleaning force ratio is lower than 1.

12. The method for cleaning a steam system of a combined cycle plant according to claim 8, wherein in the intermittent blowing step, the operation of the bypass valve is controlled so that the cleaning force ratio is lower than 1.

* * * * *